United States Patent [19]

Acetarin et al.

[11] Patent Number: 4,680,362

[45] Date of Patent: Jul. 14, 1987

[54] EMBEDDING MEDIA SUITABLE FOR THE PREPARATION OF THIN SECTIONS OF EMBEDDED BIOLOGICAL MATERIALS

[75] Inventors: Jean-Dominique Acetarin, Saint Louis, France; Werner Villiger, Basel; Eric Carlemalm, Therwil, both of Switzerland

[73] Assignee: Chemische Werke Lowi GmbH, Waldkraiburg, Fed. Rep. of Germany

[21] Appl. No.: 841,563

[22] Filed: Mar. 20, 1986

[30] Foreign Application Priority Data

Mar. 22, 1985 [EP] European Pat. Off. ........ 85103388.6

[51] Int. Cl.$^4$ ............................................. C08F 20/28
[52] U.S. Cl. .................................. 526/320; 526/323.2
[58] Field of Search .............................. 526/320, 323.2

[56] References Cited

U.S. PATENT DOCUMENTS

| 3,893,988 | 7/1975 | Seymour | 526/320 |
|---|---|---|---|
| 4,109,070 | 8/1978 | Loshaek | 526/320 |
| 4,208,313 | 6/1980 | Lewis | 526/323.2 |
| 4,368,312 | 1/1983 | Carlemalm | 526/323.2 |
| 4,424,329 | 1/1984 | Carlemalm | 526/323.2 |

FOREIGN PATENT DOCUMENTS

| 0059970A1 | 9/1982 | European Pat. Off. . |
|---|---|---|
| 0059970B1 | 7/1985 | European Pat. Off. . |
| 2748938 | 5/1979 | Fed. Rep. of Germany . |

OTHER PUBLICATIONS

Chemical Abstracts, vol. 65, No. 10745b, 1966.
J. Electron. Misrosc., vol. 28, No. 1 (1979), pp. 53–55.

Primary Examiner—Paul R. Michl
Attorney, Agent, or Firm—Bert J. Lewen; Henry Sternberg

[57] ABSTRACT

The invention concerns methods and embedding media components for producing essentially non-polar and polar embedding media. The non-polar embedding medium comprises ethyl methacrylate, n-butyl methacrylate, 1,3-butanediol dimethylacrylate, and a small amount of polymerization initiator. The polar embedding medium comprises 2-hydroxyethyl acrylate, 2-hydroxypropyl methacrylate, n-butyl methacrylate, optionally methoxyethyl methacrylate, ethoxyethyl methacrylate, 1,3-butanediol dimethacrylate, and a small amount of polymerization initiator. The embedding media of the invention are particularly suitable for the preparation of a polymer embedded biological material for light or electron microscopic study of thin sections thereof. The embedding media can be polymerized at low temperature and UV light employed for initiating polymerization.

13 Claims, No Drawings

EMBEDDING MEDIA SUITABLE FOR THE PREPARATION OF THIN SECTIONS OF EMBEDDED BIOLOGICAL MATERIALS

BACKGROUND OF THE INVENTION

This invention relates to embedding media for the preparation of thin sections of embedded biological materials. The thin sections are of the type which may be employed for light or electron microscopic study of the embedded biological materials.

U.S. Pat. No. 4,424,329 describes producing embedding media by admixing several methacrylates, a free radical polymerisation initiator, one or more co-initiators and—optionally—a plasticizer. The use of a complex initiator system instead of a simple compound is, however, a disadvantage. Apart from this, the described initiator system is not optimal for polymerisation at low temperature.

Described in J. Electron Microscopy 28, (1979) pp. 53–55, is that tree cell walls can be best observed by embedding tree cells in a medium consisting of methyl and n-butyl methacrylate and polymerizing the embedding medium. However, polymerisation is carried out only at elevated temperature with 2,2'-azobisisobutyronitrile as an initiator. Furthermore, the two-component embedding medium lacks variability.

Finally, a method of producing an embedding medium which comprises admixing several methacrylates and a free radical polymerisation initiator is described in DE-A No. 27 48 938. However, this embedding medium is likewise polymerised at elevated temperature and additionally admixing the monomer mixture with a further component of polymer powder is required Furthermore, the preparation of biological specimens with available embedding media by the thin sectioning technique, although usually adequate for general cytological work, has severe limitations for high resolution electron microscopy as in the molecular region.

In order to improve the amount of useful information retrievable, a number of deleterious effects must be minimised, including the effects of molecular denaturation, supramolecular disordering, damage by sectioning, and other factors related to observation, such as staining, and beam damage due to irradiation in the electron microscope.

Most attempts to improve embedding techniques in the past have involved the consideration that a water-soluble resin renders dehydration essentially unnecessary and that use of such resins will not lead to solvent-induced denaturation. What does not appear to have been properly observed or considered is that the liquid resin itself can be a solvent which leads to solvent denaturation. Furthermore, the fact that a liquid resin may be water-soluble does not ensure that the initial polar environment of cell structures would be maintained.

Procedures for the preparation of thin sections of embedded biological materials are in general characterized by the inability to independently alter several parameters, including particularly:

the effect on biological materials such as proteins and lipoproteins when water is replaced by organic fluids employed in the embedding procedure, the effect of polarity of the organic solvent and embedding medium, effects of temperature, effects of water content remaining after dehydration, effects of the type and duration of fixation, effect of the nature of heavy metal staining.

It is an object of the present invention to provide new embedding media enabling parameters such as above to be varied independently. This enables determination of the influence of each parameter on the different structural aspects in biological materials such as proteinaceous complexes and protein-rich lipoprotein membranes. The parameters are extremely interdependent or intercorrelated, as for example illustrated by the fact that aminoacid residues at the surface of proteins as well as polar heads of lipids are firmly associated with a layer of water, the hydration shell, and the fact that the binding of this water on proteins is different for different molecular surfaces and can "melt away" at different temperatures. Thus, the higher this "melting temperature", the "firmer" is the water bound. This phenomenon is involved in the formation of the hydrophobic bond, which becomes established only upon raising of temperature. Such bonds are entropy driven, i.e. the disorder associated with "melting" of the hydration water increases the entropy more than the association (ordering) proteins does decrease it. Many believe that the hydration shell is an important factor in establishing the tertiary structure of a protein. Pertubing or removing it, would lead to the conformational changes associated with denaturation. Therefore, the fate of the hydration shell during embedding must be considered. Similarly, with highly polar organic solvents or embedding media, in which water is soluble, the possibility of competitive effects between these liquids and the biological material for the remaining water of hydration must be considered. Particularly in a polar resin, a sort of composition might occur which removes the hydration shell, if water has a higher affinity to the resin. Since no experimental data are as yet available, this question has to be solved empirically for the embedding. Non-polar solvents or embedding media on the contrary have no affinity for water and it can be envisaged that the hydration shell is not removed, provided obviously that this was maintained during dehydration. This returns the consideration to those related to polar solvents.

Two embedding medium compositions, which take into account the considerations discussed above are described in U.S. Pat. No. 4,424,329. However, the viscosity of these compositions is a limiting factor for application at lower temperatures. To avoid these disadvantages, three new compositions two polar and one non-polar, have been developed, which enable embedding at a substantially lower temperature range.

SHORT DESCRIPTION OF THE INVENTION

The new compositions of the present invention, similar to the previous compositions, may be employed in the "PLT technique" (Progressive Lowering of Temperature), but at lower temperature of embedding. They have been more specifically designed for freeze-substitution and similar techniques. In this freeze-substitution technique, rapid freezing is effected with e.g. liquid propane or helium and cell components are stabilized and immobilized with alterations of cell structures kept to a minimum; in a second step, the substitution, the frozen water is replaced in cells by an organic solvent. Usually the frozen material is fixed (osmiumtetroxide at −90° C., or glutaraldehyde down to −50° C.) before infiltration and polymerisation. Chemical fixation modifies the cell constituents chemically and thus has an influence on their detectability by cytochemical technique, when applied directly on sections. The new compositions have been specifically designed to overcome this problem. Frozen biological materials are infiltrated and polymerized at low temperatures(−78° C. for the non-polar composition; −60° to −65° C. for the polar compositions) after the substitution step to keep the cell structures and diffusable substances immobilized by cryofixation without the introduction of a chemical fixative.

In accordance with the invention there are provided methods of producing non-polar and polar embedding media and multicomponent package comprising the components of the media for carrying out the methods. There are provided non-polar and polar embedding medium components for admixture with a cross-linking agent and a small amount of polymerisation initiator. A variety of components may be suitable for preparing non-polar and polar embedding media and similarly a variety of cross-linking agents may be suitable.

In the case of the polymerisation initiator, practically any substance capable of providing a free radical with sufficient reactivity for free radical polymerisation would be suitable for use in preparing embedding media of the present invention. At the same time, the nature of the polymerisation initiator and the amount employed in the preparation of the embedding would in general be chosen so that polymerisation is not too rapid which can cause perturbation of the cellular structures such as by "polymerisation explosion" or so that no significant amount of heat is generated, which can also lead to perturbation or distortion of cellular structures. Any benzoin would in essence be suitable for use as the polymerisation initiator, benzoin monomethylether being exemplary. The amount of polymerisation initiator employed in preparing the embedding media of the present invention is not critical, but would be at least 0.2% by weight based on the total weight of the embedding medium prepared. More than 1% of polymerisation initiator would not provide any benefit. This is true for the new polar compositions in all cases. However, as the non-polar compositions show less polymerisation reactivity than the polar compositions at embedding temperatures below −50° C., it is recommended to employ a more effective initiator, e.g. benzyldimethylacetal.

The cross-linking agent should be present in a sufficient amount in each of the embedding media of the present invention, since it is probable that the gelling effect of the cross-linking agent on the medium will lower or exclude monomer flow from one region to another in embedded cellular structure which can result in "polymerisation explosion" of the nature mentioned above, or rupture of sensitive membranes defining cell structures.

With the same considerations as above related to polymerisation rate in mind, the energy for polymerisation initiation, for example UV irradiation with 360 nm wavelength should be such that polymerisation is not too rapid.

DETAILED DESCRIPTION OF THE INVENTION

Discussing now first the non-polar embedding medium of the present invention, two non-polar monomers for admixture, or already admixed, have been established to be suitable. These are ethyl methacrylate and n-butyl methacrylate, although it is to be understood that other non-polar monomers could be employed without departing from the essential characteristics of the present invention. In view of the very extensive experimentation necessary to establish suitable ratios, effects of specific cross-linking agents on other non-polar monomers, the non-polar embedding medium of the present invention will only be described and claimed in relation to ethyl methacrylate and n-hexyl methacrylate monomers. Similarly, in the case of the cross-linking agent, only 1,3-butanediol dimethacrylate will be described and claimed as a cross-linking agent actually known and established to be suitable for this purpose at the ratios indicated.

In the case of the two polar embedding media of the present invention, two polar monomers for admixture, or already admixed, have been established to be suitable. These are 2-hydroxyethyl acrylate and 2-hydroxypropyl methacrylate. These two polar monomers are also admixed with an amount of a mixture of non-polar monomers, which for similar reasons as discussed above are identified as n-butyl methacrylate, methoxyethyl methacrylate and ethoxyethyl methacrylate. 1,3-butanediol dimethacrylate is employed as cross-linking agent in the preparation of the polar embedding media.

As already indicated, the ratios of the components employed in the preparation of the embedding media needs to be established, and upper and lower limits determined outside of which unsatisfactory results would be obtained.

The following Table I shows the components and parts by weight which are employed for the preparation of a non-polar embedding medium:

TABLE I

| component | parts by weight | typical parts by weight |
| --- | --- | --- |
| ethyl methacrylate | 52 to 70 | 60.7 |
| n-butyl methacrylate | 26 to 42 | 33.9 |
| 1,3-butanediol dimethacrylate | 4 to 7 | 5.4 |
| polymerisation initiator above −50° C. use: benzoin methylether | 0.20 to 1 | 0.50 |
| −50 to −70° C. use: benzyldimethylacetal | 0.20 to 1 | 0.50 |
| below −70° C. use: benzyldimethylacetal | 0.50 to 1.25 | 0.60 |

The following Table II shows the components and parts by weight which are employed for the preparation of a polar embedding medium:

TABLE II

| component | parts by weight | typical parts by weight |
| --- | --- | --- |
| n-butyl methacrylate | 10 to 15 | 12.2 |
| methoxyethyl methacrylate | 7 to 13 | 10.2 |
| ethoxyethyl methacrylate | 8 to 14 | 11.2 |
| 2-hydroxyethyl acrylate | 16 to 24 | 20.6 |
| 2-hydroxypropyl methacrylate | 36 to 46 | 41 |
| 1,3-butanediol dimethacrylate | 3.5 to 6 | 4.8 |
| polymerisation initiator benzoin methylether | 0.20 to 1 | 0.50 |

The methylethyl methacrylate may be eliminated from the above composition in accordance with the following Table III.

TABLE III

| component | parts by weight | typical parts by weight |
| --- | --- | --- |
| n-butyl methacrylate | 10 to 20 | 15.3 |
| ethoxyethyl methacrylate | 10 to 20 | 17.0 |
| 2-hydroxyethyl acrylate | 26 to 34 | 26.6 |
| 2-hydroxypropyl methacrylate | 35 to 45 | 36.2 |
| 1,3-butanediol dimethacrylate | 2.5 to 3.5 | 4.9 |
| polymerisation initiator benzoin methyleter | 0.20 to 1 | 0.5 |

As will be recognized from Table I above, the ratio by weight of ethyl methacrylate:n-btuyl methacrylate can lie between the two extreme limits of 52:42 and 70:26. This is equivalent to a ratio of ethyl methacrylate:n-butyl methacrylate of 1.24 to 2.70:1. Similarly, the ratio by weight of the combined ethyl methacrylate and n-butyl methacrylate:1,3-butanediol dimethacrylate can lie between the two extreme limits of 52+26:7 and 70+42:4. This is equivalent to a ratio of the combined ethyl methacrylate and n-butyl methacrylate:1,3-butanediol dimethacrylate of 11.14 to 16:1. The amount of polymerisation initiator shown in the Table I corresponds to 0.2 to 1% of the total weight of the embedding medium above −70° C. and to 0.5 to 1,25% of the total weight of the embedding medium below −70° C.

Most conveniently, the ethyl methacrylate and n-butyl methacrylate are provided in combined form in a single container at said ratio of 1.24 to 2.70:1, and the 1,3-butanediol dimethacrylate cross-linking agent is provided in a separate container. In preparing a non-polar embedding medium 11.14 to 16 parts by weight of the combined ethyl methacrylate and n-butyl methacrylate are then admixed with the 1,3-butanediol dimethacrylate and the small amount of polymerisation initiator which is conveniently provided in a further separate container. A three component package for preparing the non-polar embedding medium is therefore a convenient means for making available the non-polar embedding medium components.

In the same fashion as above, and turning now to Table II concerning the polar embedding medium, it will be recognized that the ratio by weight of the 2-hydroxyethyl acrylate:2-hydroxypropyl methacrylate can lie between the two extreme limits of 16:46 and 24:36. This is equivalent to a ratio of 2-hydroxyethyl acrylate:2-hydroxypropyl methacrylate of 0.35 to 0.67:1. Similarly, the ratio by weight of the combined 2-hydroxyethyl acrylate and 2-hydroxypropyl methacrylate:n-butyl methacrylate can lie between the two extreme limits of 16+36:15 and 24+46:10. This is equivalent to a ratio by weight of the combined 2-hydroxyethyl acrylate and 2-hydroxypropyl methacrylate:n-butyl methacrylate of 3.47 to 7:1.

The ratio by weight of the combined 2-hydroxyethyl acrylate, 2-hydroxypropyl methacrylate and n-butyl methacrylate: methoxyethyl methacrylate can lie between the extreme limits of 16+36+10:13 and 24+46+15:7, which is equivalent to a ratio by weight of combined 2-hydroxyethyl acrylate, 2-hydroxypropyl methacrylate and n-butyl methacrylate : methoxyethyl methacrylate of 4.77 to 12.15:1.

The ratio by weight of the combined 2-hydroxyethyl acrylate, 2-hydroxypropyl methacrylate, n-butyl methacrylate and methoxyethyl methacrylate:ethoxyethyl methacrylate can lie between the extreme limits of 16+36+10+7:14 and 24+46+15+13:8, which is equivalent to a ratio by weight of combined 2-hydroxyethyl acrylate, 2hydroxypropyl methacrylate, n-butyl methacrylate and methoxyethyl methacrylate:ethoxyethyl methacrylate of 4.93 to 12.25:1.

The ratio by weight of the combined 2-hydroxyethyl acrylate, 2-hydroxypropyl methacrylate, n-butyl methacrylate, methoxyethyl methacrylate and ethoxyethyl methacrylate:1,3-butanediol dimethacrylate can lie between the extreme limits of 16+36+10+7+8:6 and 24+46+15+13+14:3.5, which is equivalent to a ratio by weight of combined 2-hydroxyethyl acrylate, 2-hydroxypropyl methacrylate, n-butyl methacrylate, methoxyethyl methacrylate and ethoxyethyl methacrylate:1,3-butanediol dimethacrylate of 12.83 to 32:1.

The 2-hydroxyethyl acrylate and 2-hydroxypropyl methacrylate may be provided in combined form in a single container at said ratio of 0.35 to 0.67:1. In this case, the n-butyl methacrylate, ethoxyethyl methacrylate and 1,3-butanediol dimethacrylate are provided in separate containers. Alternatively, the 2-hydroxyethyl acrylate and n-butyl methacrylate are provided in combined admixed form in a single container at a ratio by weight of between 16:15 and 24:10, which is equivalent to a ratio by weight of 2-hydroxyethyl acrylate:n-butyl methacrylate of 1.07 to 2.40:1. The 2-hydroxypropyl methacrylate, methoxyethyl methacrylate, ethoxyethyl methacrylate and 1,3-butanediol dimethacrylate are then provided in separate containers. Yet a further alternative is to provide the 2-hydroxypropyl methacrylate and the n-butyl methacrylate in combined admixed form in a single container at a ratio by weight of between 36:15 and 46:10, which is equivalent to a ratio by weight of 2-hydroxypropyl methacrylate:n-butyl methacrylate of 2.40 to 4.60:1. In this further alternative, the 2-hydroxyethyl acrylate, methoxyethyl methacrylate, ethoxyethyl methacrylate and the 1,3-butanediol dimethacrylate are provided in separate containers.

As already indicated, the 2-hydroxyethyl acrylate, 2-hydroxypropyl methacrylate, n-butyl methacrylate, methoxyethyl methacrylate (where included) and ethoxyethyl methacrylate are most conveniently provided in admixed form in a single container. In this case 12.83 to 32 parts by weight of the admixed form are simply admixed with 1 part by weight of the 1,3-butanediol dimethacrylate and the polymerisation initiator added.

In the same fashion as above, and turning now to Table III concerning the polar embedding medium, it will be recognized that the ratio by weight of the 2-hydroxyethyl acrylate:2-hydroxypropyl methacrylate can lie between the two extreme limits of 26:40 and 34:35. This is equivalent to a ratio of 2-hydroxyethyl acrylate:2-hydroxypropyl methacrylate of 0.58 to 0.97:1. Similarly, the ratio by weight of the combined 2-hydroxyethyl acrylate and 2-hydroxypropyl methacrylate:n-butyl methacrylate can lie between the two extreme limits of 26:35:20 and 34+45:10. This is equivalent to a ratio by weight of the combined 2-hydroxyethyl acrylate and 2-hydroxypropyl methacrylate:n-butyl methacrylate of 3.05 to 7.9:1. The ratio by weight of the combined 2-hydroxyethyl ethyl acrylate, 2-hydroxypropyl methacrylate and n-butyl methacrylate:ethoxyethyl methacrylate can lie between the extreme limits of 26+35+10:20 and 34+45+20:10, which is equivalent to a ratio by weight of combined 2-hydroxyethyl acrylate, 2-hydroxypropyl methacrylate, n-butyl methacrylate and methoxyethyl methacrylate:ethoxyethyl methacrylate of 3.55 to 9.90:1.

The ratio by weight of the combined 2-hydroxyethyl acrylate, 2-hydroxypropyl methacrylate, n-butyl methacrylate and ethoxyethyl methacrylate:1,3-butanediol dimethacrylate can lie between the extreme limits of 26+35+10+10:3.5 and 34+45+20+20:2.5, which is equivalent to a ratio by weight of combined 2-hydroxyethyl acrylate, 2-hydroxypropyl methacrylate, n-butyl methacrylate and ethoxyethyl methacrylate:1,3-butanediol dimethacrylate of 23.14 to 47.6:1.

The 2-hydroxyethyl acrylate and 2-hydroxypropyl methacrylate may be provided in combined form in a single container at said ratio of 0.58 to 0.97:1. In this case, the n-butyl methacrylate, ethoxyethyl methacrylate and 1,3-butanediol dimethacrylate are provided in separate containers. Alternatively, the 2-hydroxyethyl acrylate and n-butyl methacrylate are provided in combined admixed form in a single container at a ratio by weight of between 26:20 and 34:10, which is equivalent to a ratio by weight of 2-hydroxyethyl acrylate:n-butyl methacrylate of 1.30 to 3.40:1. The 2-hydroxypropyl methacrylate, ethoxyethyl methacrylate and 1,3-butanediol dimethacrylate are then provided in separate containers. Yet a further alternative is to provide the 2-hydroxypropyl methacrylate and the n-butyl methacrylate in combined admixed form in a single container at a ratio by weight of between 35:20 and 45:10, which is equivalent to a ratio by weight of 2-hydroxypropyl methacrylate:n-butyl methacrylate of 1.75 to 4.50:1. In this further alternative, the 2-hydroxyethyl acrylate, methoxyethyl methacrylate, ethoxyethyl methacrylate and the 1,3-butanediol dimethacrylate are provided in separate containers.

As already indicated, the 2-hydroxyethyl acrylate, 2-hydroxypropyl methacrylate, n-butyl methacrylate and ethoxyethyl methacrylate are most conveniently provided in admixed form in a single container. In this case 23.14 to 47.6 parts by weight of the admixed form are simply admixed with 1 part by weight of the 1,3-butanediol dimethacrylate and the polymerisation initiator added.

Depending on the ratios chosen within the limits indicated above, the hardness and hence adaptability to sectioning can be adjusted. Thus, for example, in the non-polar embedding medium of the present invention higher proportions of ethyl methacrylate (within the limits indicated) inclines the embedding medium composition to produce an embedding having harder properties, whereas higher proportions of n-butyl methacrylate (within the limits indicated) inclines the embedding medium composition to produce an embedding having softer properties. A balance between the two properties can be achieved as desired by chosing the ratios of admixture. Similarly, if too much cross-linking agent, i.e. 1,3-butanediol dimethacrylate is employed, the resulting embedding medium will form an embedding which would be too brittle for sectioning.

The embedding media of the invention are capable of polymerisation at low temperature of −60° to −65° C. (polar medium) and to −80° C. (non-polar medium). A further characteristic of the embedding media of the present invention is their capability to absorb ultraviolet light of a wavelength which does not act on embedded biological materials such as proteins, nucleic acids and hemoglobin. It will be appreciated that if energy sources are employed which involve wavelength emissions which are absorbed by the embedded materials, the energy would not be available for activation of the polymerisation initiator. Also, it will be appreciated that on would not wish transmitted energy to act on the biological materials since this might act to destroy cellular structures.

As indicated above, a variety of components may be suitable for preparing non-polar and polar embedding media. Further exemplary monofunctional monomers which could be suitable for preparing embedding media have proper ties equivalent to those of the invention are 2-hydroxyethyl methacrylate, n-propyl methacrylate, hexyl methacrylate, ethyl acrylate, and acrylic and methacrylic esters of 2-ethylhexanol, and of methanol and methylstyrene. Other cross-linking agents which could prove suitable include ethyleneglycol dimethacrylate and divinyl benzene.

Exemplary polymerization initiators suitable for low temperature UV light polymerization and which possess the necessary activity are benzoin, benzoin ethylether, benzoin monomethylether, benzoin isopropylether, 2,2-dimethoxy-2-phenylacetophenone (benzyldimethylacetal) and 2-hydroxy-2-methyl-1-phenylpropan-1-one.

The following preparation schemes shown in Tables IV and V below are examples of two embedding procedures employing the embedding media of the present invention which have provided entirely satisfactory results at low temperatures.

TABLE IV

| (Steps 1. to 7.) | polar embedding medium | |
| --- | --- | --- |
| 1. Desired aldehyde fixation at 0° C. to 20° C. | | |
| 2. 65% ethyleneglycol | 60 min | 0° C. |
| 3. 80% ethanol | 120 min | −50° C. |
| 4. 100% polar medium typical of Table II diluted 1:1 with ethanol | 60 min | −60° C. |
| 5. 100% polar medium diluted 2:1 with ethanol | 60 min | −60° C. |
| 6. 100% polar medium | 60 min | −60° C. |
| 7. 100% polar medium | overnight or longer | −60° C. |

TABLE V

| (Steps 1. to 8.) | non-polar embedding medium | |
| --- | --- | --- |
| 1. Desired aldehyde fixation at 0° C. to 20° C. | | |
| 2. 65% ethyleneglycol | 60 min | 0° C. |
| 3. 70% ethanol | 60 min | −50° C. |
| 4. 90% ethanol | 120 min | −70° C. |
| 5. 100% non-polar medium typical of TABLE I diluted 1:1 with ethanol | 60 min | −80° C. |
| 6. 100% non-polar medium diluted 2:1 with ethanol | 60 min | −80° C. |
| 7. 100% non-polar medium | 60 min | −80° C. |
| 8. 100% non-polar medium | overnight or longer | −80° C. |

(The schemes can be adapted for any other temperature or non-polar or polar solvent as long as solubility allows it).

Polymerization: Both resins are polymerized by indirect UV—irradiation 360 nm (2 x Philips TLAD 15W/05 or equivalent) at −80° C. to −60° C. at a distance of 30–40 cm, 48 to 72 hours. Sectioning quality improves when the blocks are further hardened at room temperature for 2-3 days. Polymerization can also be carried out at room temperature.

Sectioning and Staining: The embedding media, easily yield silver to grey sections on diamond or glass knives. Optimal sectioning requires a moderate cutting speed. Poststaining is easily effected with uranyl acetate; Reynold's lead citrate appears acceptable for low magnification work. The polar embedding medium provides excellent results with immunostaining on sections with the known protein A-gold complex technique.

In the case of Epon 812 (epoxy resin, condensation product of epichlorohydrin and bisphenol A), it is impossible to gain the advantages offered by low temperature embedding procedures, which is typical of any epoxy resins which cannot be cured at low temperature. In the case of the Leduc embedding media (HPMA Leduc=hydroxypropyl methacrylate, HEM Leduc=hydroxyethyl methacrylate), which do have polar properties, these partly prepolymerized preparations resulting in too high viscosity which again eliminates possibilities to gain the advantages offered by low temperature embedding procedures.

The polar embedding medium of the present invention is water compatible and provides rapid, but uniform, infiltration and UV-polymerization without sacrifying quality. The medium maintains the low viscosity and water-miscible characteristics of previous methacrylate formulations, but does not suffer from the "melting" phenomenon during irradiation in the microscope. The inherent low viscosity of the liquid medium allows for the exploitation of a broad temperature range for specimen preparation, and can easily infiltrate a specimen and be hardened at temperatures as low as −60° to −65° C. (polar medium) and −80° C. (non-polar medium). Thus an embedding procedure for sensitive structure can be easily designed to take advantage of the stabilizing effects of the low temperatures. The polar medium also provides excellent results with immuno-staining techniques on sections.

The non-polar embedding medium of the invention is a hydrophobic medium which produces blocks of excellent sectioning quality. The medium retains the properties of low viscosity and uniform polymerization, but adds the capability of embedding material at very low temperatures. The non-polar medium can be used routinely at temperatures as low as −80° C. At these low temperatures, biological material is stabilized and may even retain its bound water. The medium also provides excellent results under conventional conditions.

The media of the invention should be prepared in brown glass containers or otherwise protected from direct light. All the components are readily miscible with each other. Excessive stirring should be avoided. Methacrylates and acrylates do cause eczema on sensitive persons, so that it is strongly recommended to use gloves when there is risk of skin contact. Polypropylene or polyethylene are suitable but not gloves made from other plastic material.

Typical dehydration and infiltration preparation schemes for embedding media at low temperatures are given in Table VI below:

TABLE VI (Steps 1. to 9.)

| | polar medium | | |
|---|---|---|---|
| 1. | Desired aldehyde fixation at 0° C. to 20° C. | | |
| 2. | 30% ethanol with water | 30 min | 0° C. |
| 3. | 50% ethanol with water | 60 min | −20° C. |
| 4. | 70% ethanol with water | 60 min | −35° C. |
| 5. | 90% ethanol with water | 120 min | −50° C. |
| 6. | 100% polar medium diluted 1:1 with ethanol | 60 min | −60° C. |
| 7. | 100% polar medium diluted 2:1 with ethanol | 60 min | −60° C. |
| 8. | 100% polar medium | 60 min | −60° C. |
| 9. | 100% polar medium | overnight | −60° C. |
| | non-polar medium | | |
| 1. | Desired aldehyde fixation at 0° C. to 20° C. | | |
| 2. | 30% ethanol with water | 30 min | 0° C. |
| 3. | 50% ethanol with water | 60 min | −20° C. |
| 4. | 70% ethanol with water | 60 min | −50° C. |
| 5. | 90% ethanol with water | 120 min | −70° C. |
| 6. | 100% non-polar medium diluted 1:1 with ethanol | 60 min | −80° C. |
| 7. | 100% non-polar medium diluted 2:1 with ethanol | 60 min | −80° C. |
| 8 | 100% non-polar medium | 60 min | −80° C. |
| 9. | 100% non-polar medium | overnight | −80° C. |

At all temperatures below 0° C. care must be taken not to allow the residual water in the specimen to freeze during the dehydration steps.

Both resins can be hardened at room temperature with direct irradiation. However, it is recommended that the original initiator be exchanged for the same amount of benzoin ethylether. Room temperature polymerized blocks can be ready for sectioning after a few hours.

General characteristics: Specimens embedded with the media of the present invention show that excellent ultrastructural preservation is feasible without heavy metal fixation. Enough contrast for observation may be subsequently introduced through section staining or by dark-field microscopy. The non-polar medium is particularly suitable for dark-field observation due to its low density as compared to conventional embedding media.

A further practical application for the embedding media of the present invention is embedding of biological, archeological and other artifacts for preservation purposes.

I claim:

1. A method of producing an essentially non-polar embedding medium, which comprises the step of admixing ethyl methacrylate, n-butyl methacrylate, 1,3-butanediol diol dimethacrylate and a free radical polymerisation initiator at a ratio by weight of ethyl methacrylate:n-butyl methacrylate of 1.24 to 2.70:1, a ratio by weight of the combined ethyl methacrylate and n-butyl methacrylate:1,3-butanediol dimethacrylate of 11.14 to 16:1, and the polymerization initiator being included in the mixture in a small amount of from about 0.2% to about 1% by weight at above −70° C., and 0.50% to 1.25% at below −70° C., based on the total weight of the resulting embedding medium, the purity of each of the components being at least 90% by weight.

2. A method according to claim 1, in which the ethyl methacrylate and the n-butyl methacrylate are provided in combined admixed form at said ratio by weight of 1.24 to 2.70:1 and in which 11.14 to 16 parts by weight of this combined form are then admixed with 1 part by weight of 1,3-butanediol dimethacrylate and the said small amount of polymerization initiator.

3. A method of producing a polar embedding medium, which comprises the step of admixing 2-hydroxyethyl acrylate, 2-hydroxypropyl methacrylate, n-butyl methacrylate, methoxyethyl methacrylate, ethoxyethyl methacrylate, 1,3-butanediol dimethacrylate and a free radical polymerization initiator at a ratio by weight of 2-hydroxyethyl acrylate:2-hydroxypropyl methacrylate of 0.35 to 0.67:1, a ratio by weight of the combined 2-hydroxyethyl acrylate and 2-hydroxypropyl methacrylate:n-butyl methacrylate of 3.47 to 7:1, a ratio by weight of the combined 2-hydroxyethyl acrylate, 2-hydroxypropyl methacrylate and n-butyl methacrylate:methoxyethyl acrylate of 4.77 to 12.15:1, a ratio by weight of the combined 2-hydroxymethyl acrylate, 2-hydroxypropyl methacrylate, n-butyl methacrylate and methoxyethyl methacrylate:ethoxyethyl methacrylate of 4.93 to 12.25:1, a ratio by weight of the combined 2-hydroxyethyl acrylate, 2-hydroxypropyl methacrylate, n-butyl methacrylate, methoxyethyl methacrylate and ethoxyethyl methacrylate:1,3-butanediol dimethacrylate of 12.83 to 32:1, and the polymerization initiator being included in the mixture in a small amount of from about 0.2% to about 1% by weight, based on the total weight of the resulting embedding medium, the purity of each of the components being at least 90% by weight.

4. A method of producing a polar embedding medium, which comprises the step of admixing 2-hydroxyethyl acrylate, 2-hydroxypropyl methacrylate, n-butyl methacrylate, ethoxyethyl methacrylate, 1,3-butanediol dimethacrylate and a free radical polymerisation initiator at a ratio by weight of 2-hydroxyethyl acrylate:2-hydroxypropyl methacrylate of 0.58 to 0.97:1, a ratio by weight of the combined 2-hydroxyethyl acrylate and 2-hydroxypropyl methacrylate:n-butyl methacrylate of 3.05 to 7.9:1, a ratio by weight of the combined 2-hydroxyethyl acrylate, 2-hydroxypropyl methacrylate and n-butyl methacrylate:ethoxyethyl methacrylate of 3.55 to 9.90:1, a ratio by weight of the combined 2-hydroxyethyl acrylate, 2-hydroxypropyl methacrylate, n-butyl methacrylate and ethoxyethyl methacrylate:1,3-butanediol dimethacrylate of 23.24 to 47.6:1, and the polymerisation initiator being included in the mixture in a smallamount of from about 0.2% to about 1% by weight, based on the total weight of the resulting embedding medium, the purity of each of the components being at least 90% by weight.

5. A method according to claim 3, in which the 2-hydroxyethyl acrylate and 2-hydroxypropyl methacrylate are provided in combined admixed form at said ratio by weight of 0.35 to 0.67:1.

6. A method according to claim 3, in which at most the 2-hydroxyethyl acrylate, 2-hydroxypropyl methacrylate, n-butyl methacrylate, methoxyethyl methacrylate and ethoxyethyl methacrylate are provided in combined admixed form at a ratio by weight of 2-hydroxyethyl acrylate: 2-hydroxypropyl methacrylate:n-butyl methacrylate:methoxyethyl methacrylate:ethoxyethyl methacrylate of 16 to 24:36 to 46:10 to 15:7 to 13:8 to 14.

7. A method according to claim 4, in which at most the 2-hydroxyethyl acrylate, 2-hydroxypropyl methacrylate, n-butyl methacrylate and ethoxyethyl methacrylate are provided in combined admixed form at a ratio by weight of 2-hydroxyethyl acrylate:2-hydroxypropyl methacrylate:n-butyl methacrylate:ethoxyethyl methacrylate of 26 to 34:35 to 45:10 to 20:10 to 20.

8. A non-polar embedding medium for the preparation of a biological material embedding composition having the following components at the parts by weight shown in the following table:

| component | parts by weight |
|---|---|
| ethyl methacrylate | 52 to 70 |
| n-butyl methacrylate | 26 to 42 |
| 1,3-butanediol dimethacrylate | 4 to 7 |
| polymerization initiator | 0.20 to 1.25 |

9. A non-polar embedding medium for the preparation of a biological material embedding composition according to claim 8, in which typical parts by weight of said components are as shown in the following table:

| component | parts by weight |
|---|---|
| ethyl methacrylate | 60.7 |
| n-butyl methacrylate | 33.9 |
| 1,3-butanediol dimethacrylate | 5.4 |
| polymerization initiator | 0.5 above $-70°$ C. |
|  | 0.75 below $-70°$ C. |

10. A polar embedding medium for the preparation of a biological material embedding composition having the following components at the parts by weight shown in the following table:

| component | parts by weight |
|---|---|
| 2-hydroxyethyl acrylate | 16 to 24 |
| 2-hydroxypropyl methacrylate | 36 to 46 |
| n-butyl methacrylate | 10 to 15 |
| methoxyethyl methacrylate | 7 to 13 |
| ethoxyethyl methacrylate | 8 to 14 |
| 1,3-butanediol dimethacrylate | 3.5 to 6 |
| polymerization initiator | 0.20 to 1 |

11. A polar embedding medium for the preparation of a biological material embedding composition according to claim 10, in which typical parts by weight of said components are as shown in the following table:

| component | parts by weight |
|---|---|
| 2-hydroxyethyl acrylate | 20.6 |
| 2-hydroxypropyl methacrylate | 41 |
| n-butyl methacrylate | 12.2 |
| methoxyethyl methacrylate | 10.2 |
| ethoxyethyl methacrylate | 11.2 |
| 1,3-butanediol dimethacrylate | 4.8 |
| polymerization initiator | 0.5 |

12. A polar embedding medium for the preparation of a biological material embedding composition having the following components at the parts by weight shown in the following table:

| component | parts by weight |
|---|---|
| n-butyl methacrylate | 10 to 20 |
| ethoxyethyl methacrylate | 10 to 20 |
| 2-hydroxyethyl acrylate | 26 to 34 |
| 2-hydroxypropyl methacrylate | 35 to 45 |
| 1,3-butanediol dimethacrylate | 2.5 to 3.5 |
| polymerisation initiator | 0.20 to 1 |

| component | parts by weight |
| --- | --- |
| benzoin methylether | — |

13. A polar embedding medium for the preparation of a biological material embedding composition according to claim 12, in which typical parts by weight of said components are as shown in the following table:

| component | typical parts by weight |
| --- | --- |
| n-butyl methacrylate | 15.3 |
| ethoxyethyl methacrylate | 17.0 |
| 2-hydroxyethyl acrylate | 26.6 |
| 2-hydroxypropyl methacrylate | 36.2 |
| 1,3-butanediol dimethacrylate | 4.9 |
| polymerisation initiator benzoin methylether | 0.5 |

* * * * *